UNITED STATES PATENT OFFICE.

KARL GOLDSCHMIDT, OF BROOKLYN, NEW YORK.

VARNISHING COMPOSITION AND PROCESS OF MAKING SAME.

No. 859,937.        Specification of Letters Patent.        Patented July 16, 1907.

Application filed November 6, 1906. Serial No. 342,182.

*To all whom it may concern:*

Be it known that I, KARL GOLDSCHMIDT, a citizen of the Republic of Argentine, and a resident of Brooklyn, county of Kings, and State of New York, have invented certain new and useful Improvements in Varnishing Compositions and Processes of Making Same, of which the following is a specification.

My invention relates to a novel varnishing composition for coating metals, wood, stone and the like.

It is the special object of this invention to produce an efficient and cheap varnishing composition by means of a simple and inexpensive process.

The new product renders the objects coated therewith water- and moisture proof. In addition thereto the surface of the coating produced with this novel varnish is such that calcimine, glue, oil paints or wall paper may be directly applied thereto without necessitating a special preparation of same.

In carrying out my invention I substantially proceed as follows:—One hundred pounds of the best and hardest tar asphalt are heated up to a temperature of about 172° F until the asphalt is completely melted and in a liquid condition. By this treatment all the water or moisture contained in the asphalt or mechanically adhering thereto is expelled. This tar asphalt is obtained through distillation of coal tar and forms the hard and glossy residue of same when the volatile and liquid products have been distilled off. When the asphalt is in the liquid condition a small quantity of benzene is stirred in. Benzene when chemically pure has the formula $C_6H_6$. I however use crude benzene, the second run of the raw benzene which is not the pure chemical product and therefore cheaper. Now the liquefied asphalt is allowed to cool off and during the process of cooling more benzene is gradually added and stirred in until about 50 pounds of the crude benzene have been incorporated therewith.

While liquefying the tar asphalt I prepare separately a batch of a mixture of a suitable metal oxid and a drying oil, preferably linseed oil, by boiling them together until the metal oxid is dissolved. Of the metal oxids adapted for the purpose I prefer to use the red oxid of lead because this helps to protect the metal which is coated with the finished varnish. However dioxid of manganese or iron oxid may be used. For the above mentioned quantity of tar asphalt five pounds of red oxid of lead are dissolved in five pounds of crude linseed oil by boiling them together. This mixture of raw linseed oil and red oxid of lead is allowed to cool off to a temperature somewhat below the boiling point of benzene say to 150° F as the temperature for admixing the mixture of linseed oil and red oxid of lead must be somewhat below the boiling point of the benzene so that part of the benzene does not distil off. When all the benzene has been admixed with the tar asphalt the mixture of linseed oil and red oxid of lead is stirred in while the asphalt is still cooling off. As stated the mixture of linseed oil and red oxid of lead is then at a temperature of about 150° F. It is of course understood that the mass must be stirred very well for the purpose of mixing the various compounds. When completely cooled the varnish is ready for use. It is important to observe closely the temperatures in this process because varnish made at a lower temperature than the one stated does not dry well. When made at a higher temperature the varnish gets too hard when applied and cracks and peels off. However when made at proper temperatures and the right materials are used the resulting varnish when applied to thin metal sheeting is flexible and hard and the metal sheeting may be bent without destroying its varnished surface or cracking same. In place of tar asphalt I may employ petroleum asphalt which is the residue of the Pennsylvania oil distillation.

The resulting product is a liquid composition and constitutes a varnish or paint which can be readily applied upon and firmly adheres to metals such as iron or steel which latter are thereby effectively protected against rust. As above stated the varnish or paint is water proof and therefore it is well adapted for painting roofs, walls of wood, stone or the like and can also be used for painting ships.

I have found that calcimine, glue or oil paint will remain unchanged in color when applied upon surfaces of coatings produced by my varnish or paint.

Having thus described my invention I claim as new and desire to secure by Letters Patent:—

1. The process of producing a liquid varnish or paint for coating steel and iron consisting in melting 100 pounds of hard asphalt at 172° F., adding a small quantity of crude benzene, allowing this composition to cool and stirring in during the process of cooling more crude benzene until 50 pounds have been incorporated, and adding then at a temperature of about 150° F. 10 pounds of a boiled mixture of equal parts of linseed oil and lead oxid.

2. As a novel composition of matter a varnish or paint for coating steel and iron composed of 100 pounds of hard asphalt, 50 pounds of crude benzene and a mixture of 5 pounds of red oxid of lead and 5 pounds of crude linseed oil and existing in form of a liquid.

Signed at New York, N. Y., this 5th day of November 1906.

KARL GOLDSCHMIDT.

Witnesses:
  LUDWIG K. BÖHM,
  CATHERINE M. MANNING.